(12) United States Patent
Olsen et al.

(10) Patent No.: US 10,844,791 B2
(45) Date of Patent: *Nov. 24, 2020

(54) GAS TURBINE COMBUSTION ACOUSTIC DAMPING SYSTEM

(71) Applicant: DRESSER-RAND COMPANY, Olean, NY (US)

(72) Inventors: Andrew J. Olsen, Amesbury, MA (US); Ivar Austrem, Oslo (NO); Serkan Yildirim, Mjondalen (NO); Zheji Liu, Olean, NY (US)

(73) Assignee: DRESSER-RAND COMPANY, Olean, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 15/450,357

(22) Filed: Mar. 6, 2017

(65) Prior Publication Data

US 2017/0175641 A1 Jun. 22, 2017

Related U.S. Application Data

(63) Continuation of application No. 14/566,963, filed on Dec. 11, 2014, now Pat. No. 9,625,158.

(Continued)

(51) Int. Cl.
*F02C 7/24* (2006.01)
*F23R 3/60* (2006.01)
(Continued)

(52) U.S. Cl.
CPC .................. *F02C 7/24* (2013.01); *F01D 5/02* (2013.01); *F02C 3/04* (2013.01); *F02C 3/145* (2013.01);
(Continued)

(58) Field of Classification Search
CPC ...... F02C 3/145; F02C 7/24; F05D 2260/963; F23R 3/06; F23R 3/44; F23R 3/46;
(Continued)

(56) References Cited

U.S. PATENT DOCUMENTS 4,695,247 A 9/1987 Enzaki et al.
6,530,221 B1 3/2003 Sattinger et al.
(Continued)

FOREIGN PATENT DOCUMENTS

WO 9917057 A1 4/1999

OTHER PUBLICATIONS

"The Jet Engine", Jul. 1969, Rolls-Royce Limited, 3rd Edition, p. 13 (Year: 1969).*

(Continued)

*Primary Examiner* — Scott J Walthour

(57) ABSTRACT

A gas turbine may include a rotatable shaft, a compressor disposed about the rotatable shaft and configured to output compressed air, and a combustor disposed about the rotatable shaft. The combustor may be configured to receive the compressed air and output high temperature compressed gas. The gas turbine may further include a power turbine disposed about the rotatable shaft and configured to receive the high temperature compressed gas, and a first liner defining a plurality of holes and disposed around the combustor. The power turbine may be configured to expand the high temperature compressed gas and rotate the rotatable shaft. The first liner may have a first end and a longitudinally opposite second end. The first end may be coupled to an inner surface of the casing at or adjacent an upstream end of the combustor and the second end may be substantially free from any connection with the casing.

10 Claims, 6 Drawing Sheets

Related U.S. Application Data

(60) Provisional application No. 61/940,956, filed on Feb. 18, 2014.

(51) Int. Cl.

| | | |
|---|---|---|
| *F23R 3/00* | (2006.01) |
| *F23R 3/54* | (2006.01) |
| *F02C 3/14* | (2006.01) |
| *F23R 3/06* | (2006.01) |
| *F01D 5/02* | (2006.01) |
| *F02C 3/04* | (2006.01) |
| *F02C 7/18* | (2006.01) |
| *F04D 29/32* | (2006.01) |
| *F23R 3/14* | (2006.01) |
| *F23R 3/28* | (2006.01) |

(52) U.S. Cl.
CPC .............. *F02C 7/18* (2013.01); *F04D 29/321* (2013.01); *F23R 3/002* (2013.01); *F23R 3/06* (2013.01); *F23R 3/14* (2013.01); *F23R 3/286* (2013.01); *F23R 3/54* (2013.01); *F23R 3/60* (2013.01); *F05D 2220/32* (2013.01); *F05D 2240/35* (2013.01); *F05D 2240/60* (2013.01); *F05D 2260/201* (2013.01); *F05D 2260/96* (2013.01); *F05D 2260/963* (2013.01); *F05D 2270/14* (2013.01); *F23R 2900/00014* (2013.01); *F23R 2900/03041* (2013.01); *F23R 2900/03042* (2013.01); *F23R 2900/03044* (2013.01)

(58) Field of Classification Search
CPC .... F23R 3/54; F23R 3/60; F23R 2900/00014; F23R 2900/03041; F23R 2900/03042; F23R 2900/03044; F23R 2900/03342

See application file for complete search history.

(56) References Cited

U.S. PATENT DOCUMENTS

| | | | |
|---|---|---|---|
| 6,601,672 B2 | 8/2003 | Liu | |
| 8,596,413 B2 | 12/2013 | Seib | |
| 9,625,158 B2* | 4/2017 | Olsen | F04D 29/321 |
| 2004/0261419 A1 | 12/2004 | McCaffrey et al. | |
| 2010/0011771 A1* | 1/2010 | Evulet | F23R 3/34 |
| | | | 60/746 |
| 2011/0107766 A1 | 5/2011 | Davis, Jr. et al. | |
| 2011/0220433 A1 | 9/2011 | Nakamura et al. | |
| 2012/0111014 A1 | 5/2012 | Beran et al. | |
| 2012/0198854 A1 | 8/2012 | Schilp et al. | |
| 2013/0037345 A1 | 2/2013 | Wang et al. | |
| 2013/0074471 A1 | 3/2013 | Khan et al. | |
| 2013/0180257 A1* | 7/2013 | Stastny | F23R 3/005 |
| | | | 60/772 |
| 2014/0020393 A1* | 1/2014 | Nakamata | F23R 3/002 |
| | | | 60/754 |

OTHER PUBLICATIONS

PCT/US2014/069876—International Searching Authority, International Search Report and the Written Opinion of the International Searching Authority, or the Declaration, dated Apr. 13, 2015, 15 pages.

PCT/US14/691376—International Preliminary Examining Authority, International Preliminary Report on Patentability, dated Feb. 26, 2016, 21 pages.

\* cited by examiner

GAS TURBINE COMBUSTION ACOUSTIC DAMPING SYSTEM

CROSS-REFERENCE TO RELATED APPLICATIONS

The present application is a continuation of co-pending U.S. patent application having Ser. No. 14/566,963, filed on Dec. 11, 2014, which claims the benefit of U.S. Provisional Patent Application having Ser. No. 61/940,956, filed on Feb. 18, 2014. These priority applications are hereby incorporated by reference in their entirety into the present application to the extent consistent with the present application.

BACKGROUND

Gas turbines may include a compressor for compressing air, a combustor for producing a hot gas by burning fuel in the presence of the compressed air produced by the compressor, and a turbine for expanding the hot gas to extract shaft power. The combustor may be operated such that a low level of emissions, such as oxides of nitrogen (NOx), are produced by the combustor.

In order to reduce the amount of NOx emissions, a lean-premix fuel may be provided to the combustor. A fuel-lean premix may include fuel premixed with an excess of air (e.g., air in a quantity more than stoichiometrically required for combustion). While the fuel-lean premix may reduce the amount of NOx emissions, high frequency combustion instabilities, commonly referred to as "high frequency dynamics" or "screech oscillations," may result from burning rate fluctuations inside the combustors when the fuel-lean premix is burned in the combustors. These burning rate fluctuation instabilities may create pressure waves (also referred to as acoustic energy) that may damage the combustor.

One way to reduce these damaging pressure waves is to operate the combustor at maximum power and at standard atmospheric conditions, and design the combustor such that the frequency of pressure waves does not coincide with the natural frequency of oscillation of the sheet metal of the combustor. However, gas turbines may generally operate to provide a wide range of output power under a wide range of operating temperature and pressure, and, as a result, pressure waves having a range of frequencies may be generated in the combustor. It may, therefore, be difficult to design a combustor such that the frequency of pressure waves does not coincide with the natural frequency of oscillation of the sheet metal of the combustor.

What is needed, then, is a combustor of a gas turbine that may produce low level NOx emissions and dampen the generated acoustic energy while operating over a wide range of operating temperatures and pressures.

SUMMARY

Example embodiments of the disclosure may provide a gas turbine. The gas turbine may include a rotatable shaft, a compressor disposed about the rotatable shaft and configured to output compressed air, and a combustor disposed about the rotatable shaft and at least partially enclosed in a casing of the gas turbine. The combustor may be configured to receive the compressed air and output high temperature compressed gas having a temperature greater than the compressed air. The gas turbine may further include a power turbine disposed about the rotatable shaft and configured to receive the high temperature compressed gas from the combustor, and a first liner that defines a plurality of holes and is disposed around the combustor. The power turbine may be configured to expand the high temperature compressed gas and rotate the rotatable shaft. The first liner may have a first end and a longitudinally opposite second end. The first end may be coupled to an inner surface of the casing at or adjacent an upstream end of the combustor and the second end may be substantially free from any connection with the casing.

Example embodiments of the disclosure may provide another gas turbine. The gas turbine may include a rotatable shaft, a compressor disposed about the rotatable shaft and configured to output compressed air, and a combustor disposed about the rotatable shaft and at least partially enclosed in a casing of the gas turbine. The combustor may be configured to receive the compressed air and to output high temperature compressed gas having a temperature greater than the compressed air. The compressed air and fuel may be ignited in a combustion zone of the combustor to produce the high temperature compressed gas. The combustor may define a plurality of effusion cooling holes disposed adjacent the combustion zone. The gas turbine may further include a power turbine disposed about the rotatable shaft and configured to receive the high temperature compressed gas from the combustor, and a first liner defining a plurality of holes and disposed around the combustor. The power turbine may be configured to expand the high temperature compressed gas and rotate the rotatable shaft. The first liner may have a first end and a longitudinally opposite second end. The first end may be coupled to an inner surface of the casing at or adjacent an upstream end of the combustor and the second end may be substantially free from any connection with the casing.

Example embodiments of the disclosure may provide yet another gas turbine. The gas turbine may include a rotatable shaft, a compressor disposed about the rotatable shaft and configured to output compressed air, a combustor disposed about the rotatable shaft and configured to output high temperature compressed gas having a temperature greater than the compressed air, and a power turbine disposed about the rotatable shaft and configured to receive the high temperature compressed gas from the combustor. The power turbine may be configured to expand the high temperature compressed gas and rotate the rotatable shaft. The gas turbine may further include a first liner defining a plurality of impingement cooling holes and a second acoustic liner defining a plurality of holes and having a first end and a longitudinally opposite second end. The first end of the second acoustic liner may be coupled to the first liner. The first liner may be coupled to an outer surface of the combustor and the first liner and the outer surface of the combustor may define an acoustic chamber therebetween. At least a portion of the outer surface defining the acoustic chamber may define a plurality of effusion cooling holes, and the plurality of impingement cooling holes and the plurality of effusion cooling holes may be configured to attenuate acoustic energy generated in the combustor.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
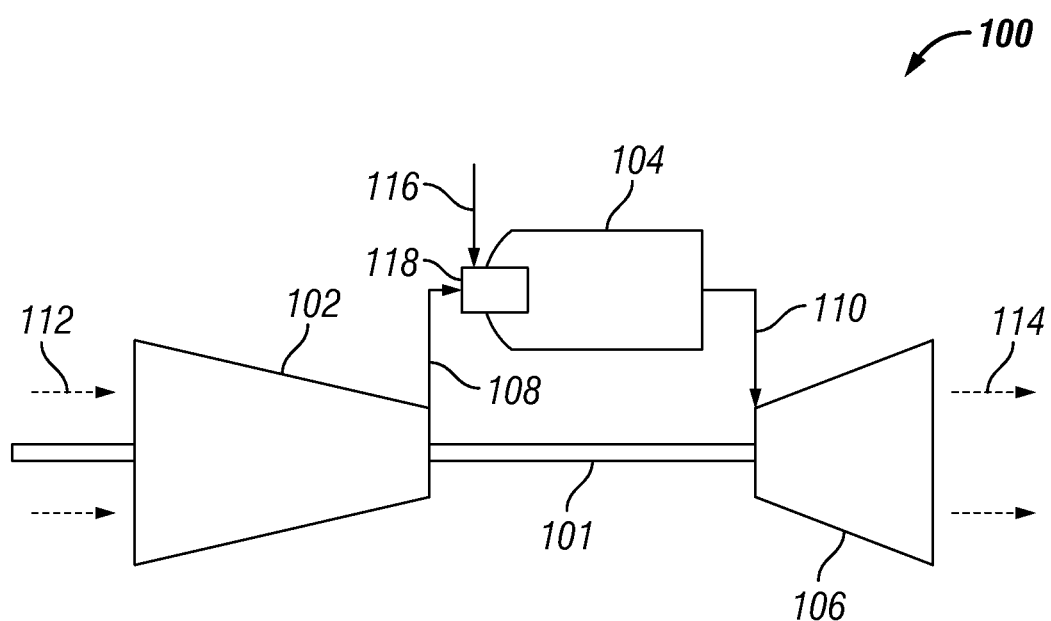
FIG. 1 is a schematic diagram of a gas turbine including a combustor, according to example embodiments.

It is to be understood that the following disclosure describes several exemplary embodiments for implementing different features, structures, or functions of the present disclosure. Exemplary embodiments of components, arrangements, and configurations are described below to simplify the present disclosure; however, these exemplary embodiments are provided merely as examples and are not intended to limit the scope of the present disclosure. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and the claims to refer to particular components. As one skilled in the art will appreciate, various entities may refer to the same component by different names, and as such, the naming convention for the elements described herein is not intended to limit the scope of the present disclosure, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 is a schematic diagram of a gas turbine 100, according to example embodiments. The gas turbine 100 may include a compressor 102 (e.g., a centrifugal compressor) that may be driven by a power turbine 106 via a rotatable shaft 101. Ambient air 112 may be drawn into the compressor 102 and may be compressed. The compressed air 108 may be directed to a combustion system that may include a plurality of combustors 104 (e.g., can-annular combustors, only one combustor 104 is illustrated) circumferentially disposed around the shaft 101 and a fuel nozzle 118 that may introduce fuel 116 from an external fuel source (not shown) into the plurality of combustors 104. In the combustors 104, the fuel 116 may be burned in the compressed air 108 to produce a high temperature compressed gas 110 having a temperature relatively greater than the compressed air 108.

The high temperature compressed gas 110 produced by the combustors 104 may be directed to the power turbine 106 where high temperature compressed gas 110 may be expanded, thereby producing shaft power for driving the compressor 102. The expanded gas 114 produced by the power turbine 106 may be exhausted, for example, to the atmosphere.

Figure 2:
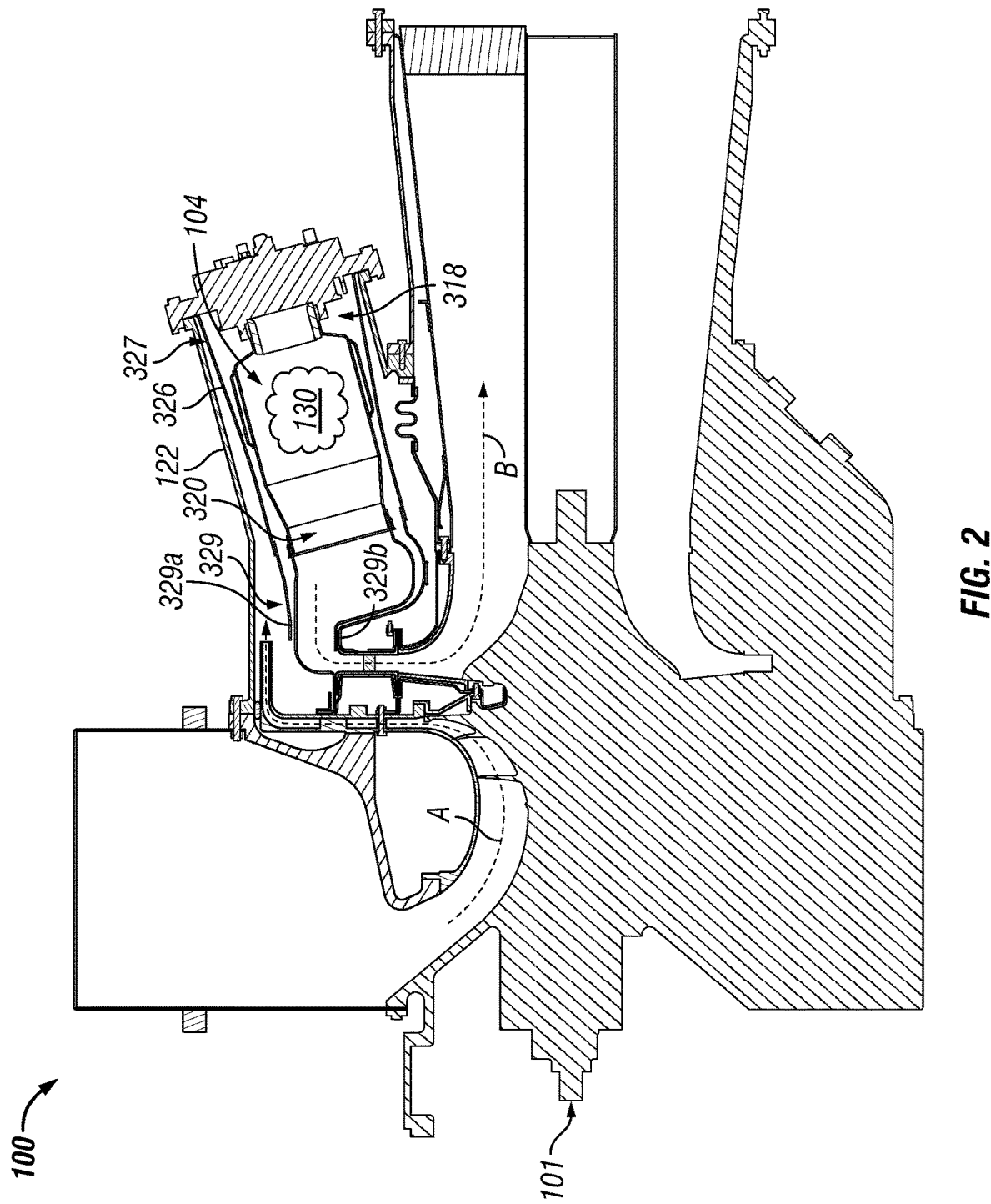
FIG. 2 is a partial cross-sectional view illustrating in relatively greater detail the gas turbine including the combustor of FIG. 1.

FIG. 2 is a partial cross-sectional view illustrating in relatively greater detail the gas turbine 100 including the combustor 104. Although only one combustor 104 is shown, it will be understood that the gas turbine 100 may include a plurality of combustors 104 circumferentially disposed about the shaft, generally indicated at 101. The plurality of combustors 104 may be enclosed by an external casing 122 of the gas turbine 100. The compressed air 108 may enter an area between the casing 122 and the combustor 104, as generally indicated by the arrow A. Each combustor 104 may define a combustion zone 130 (e.g., a single combustor zone) located therein and a mixture of the compressed air 108 and fuel 116 may be ignited in the combustion zone 130. Due to combustion of the compressed air 108 and fuel 116, the high temperature compressed gas 110 may be produced and may be directed to the power turbine 106 (FIG. 1), as generally indicated by the arrow B.

Figure 3B:
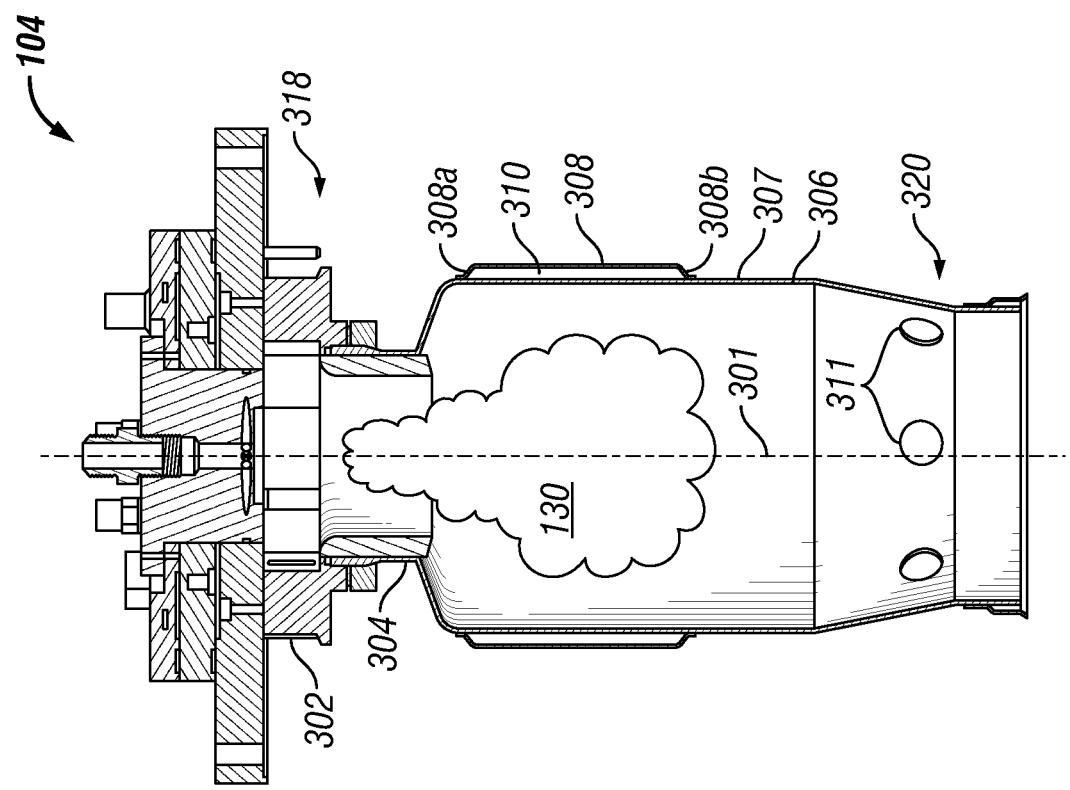
FIG. 3B illustrates a cross-sectional view of the combustor in FIG. 3A along line 3B-3B, according to example embodiments.
Figure 3A:
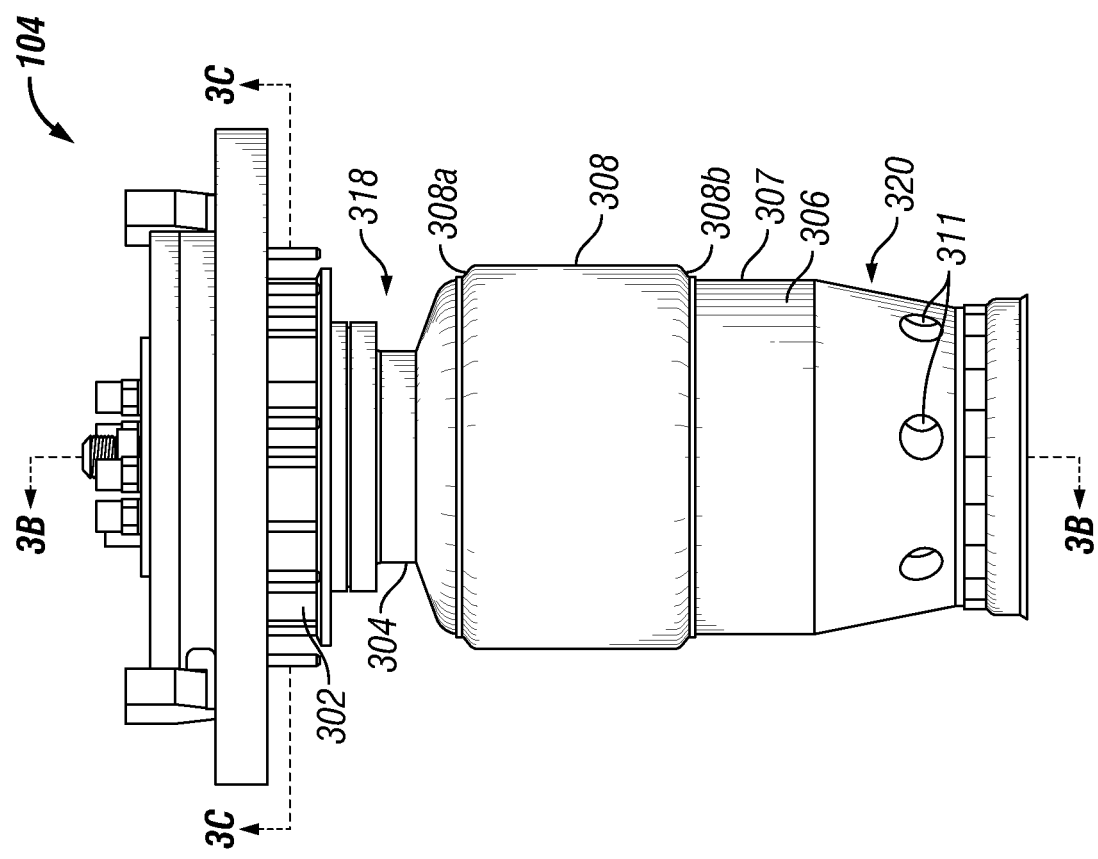
FIG. 3A illustrates a plan view of the combustor in FIGS. 1 and 2, the combustor including a swirler, a mixer, and a combustor body, according to example embodiments.
Figure 3C:
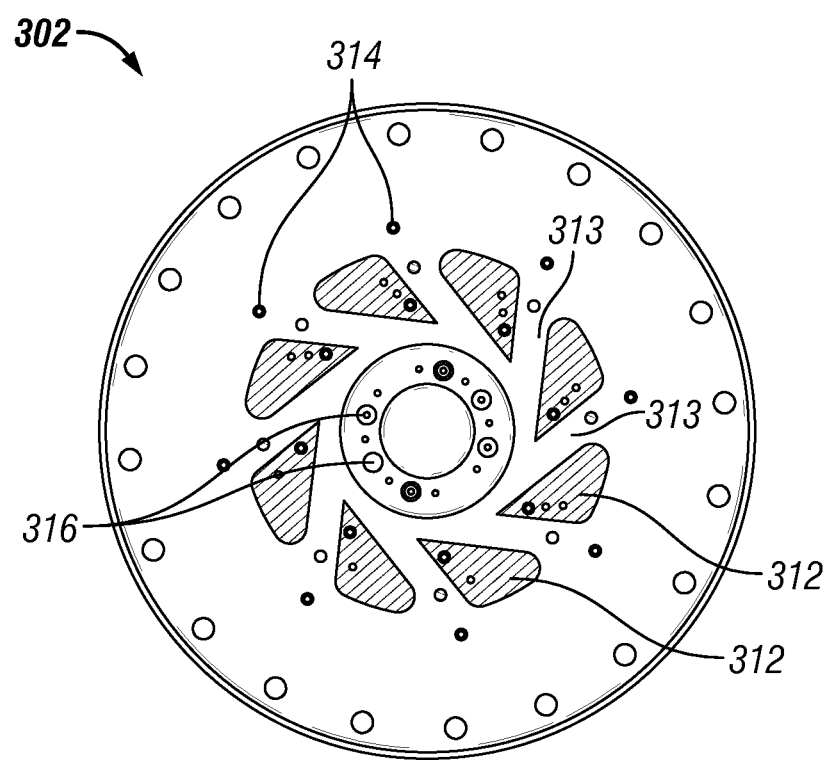
FIG. 3C illustrates a cross-sectional view of the swirler in FIG. 3A along line 3C-3C, according to example embodiments.

FIG. 3A illustrates a plan view of the combustor 104 including a swirler 302, according to example embodiments. FIG. 3B illustrates a cross-sectional view of the combustor 104 along line 3B-3B in FIG. 3A, according to example embodiments. FIG. 3C illustrates a cross-sectional view of the swirler 302 of the combustor 104 along line 3C-3C in FIG. 3A, according to example embodiments. Referring to FIGS. 3A and 3B, the combustor 104 may include a swirler 302 at an upstream end 318 and a generally cylindrical combustor body 306 at a downstream end 320. The swirler 302 may be in fluid communication with the combustor body 306 via a generally cylindrical mixer 304 disposed therebetween. As illustrated, a radial extent of the mixer 304 may be relatively smaller than a radial extent of the swirler 302 and a radial extent of the combustor body 306. The swirler 302, the mixer 304, and the combustor body 306 may be coupled to each other in an end-to-end relationship along a central axis 301 of the combustor 104. For example, an inlet (not shown) of the mixer 304 may be coupled to an outlet (not shown) of the swirler 302 and an outlet of the mixer 304 may be coupled to an inlet (not shown) of the combustor body 306.

A first acoustic liner 308 may be disposed encircling a portion of an outer surface 307 of the combustor body 306. The first acoustic liner 308 may be radially spaced from the outer surface 307 and may be coupled thereto via sidewalls 308a, 308b extending from the edges of the first acoustic liner 308. As shown, the first acoustic liner 308 may generally be disposed at or adjacent the location of the combustion zone 130 in the combustor body 306. An acoustic chamber 310 may be formed by the first acoustic liner 308 and the outer surface 307 connected to each other via the sidewalls 308a, 308b. A plurality of circumferentially disposed dilution holes 311 may be defined by the combustor body 306 at or adjacent the downstream end 320. The high temperature compressed gas 110 (FIG. 1) may exit from the downstream end 320.

Referring to FIG. 3C in conjunction with FIGS. 1 and 3B, the swirler 302 may include a plurality of swirler vanes 312 disposed about the central axis 301 (FIG. 3B). A plurality of swirler channels 313 may be defined by the swirler 302, each swirler channel 313 being disposed between adjacent swirler vanes 312. Fuel 116 (FIG. 1) may enter the combustor 104 via fuel pegs 314 disposed in a generally circular manner about the swirler vanes 312. As will be described later, pilot fuel may be introduced in the swirler 302 via pilot fuel holes 316. The compressed air 108 (FIG. 1) may enter the swirler 302 and may traverse the swirler channels 313, and the swirler vanes 312 may impart a swirling motion to the compressed air 108 traversing the swirler channels 313. The swirling compressed air 108 and fuel 116 may flow downstream into the mixer 304 and mix with each other in the mixer 304. The swirling compressed air 108 and fuel 116 may continue to mix with each other as the swirling compressed air 108 and fuel 116 travel further downstream into the combustor body 306. The mixture of fuel 116 and swirling compressed air 108 may be ignited in the combustion zone 130. The swirling motion imparted by the swirler vanes 312 to the compressed air 108 may ensure relatively uniform mixing of the fuel 116 and the compressed air 108, thereby reducing locally fuel-rich mixtures and the associated high temperatures that may increase NOx generation.

Figure 4:
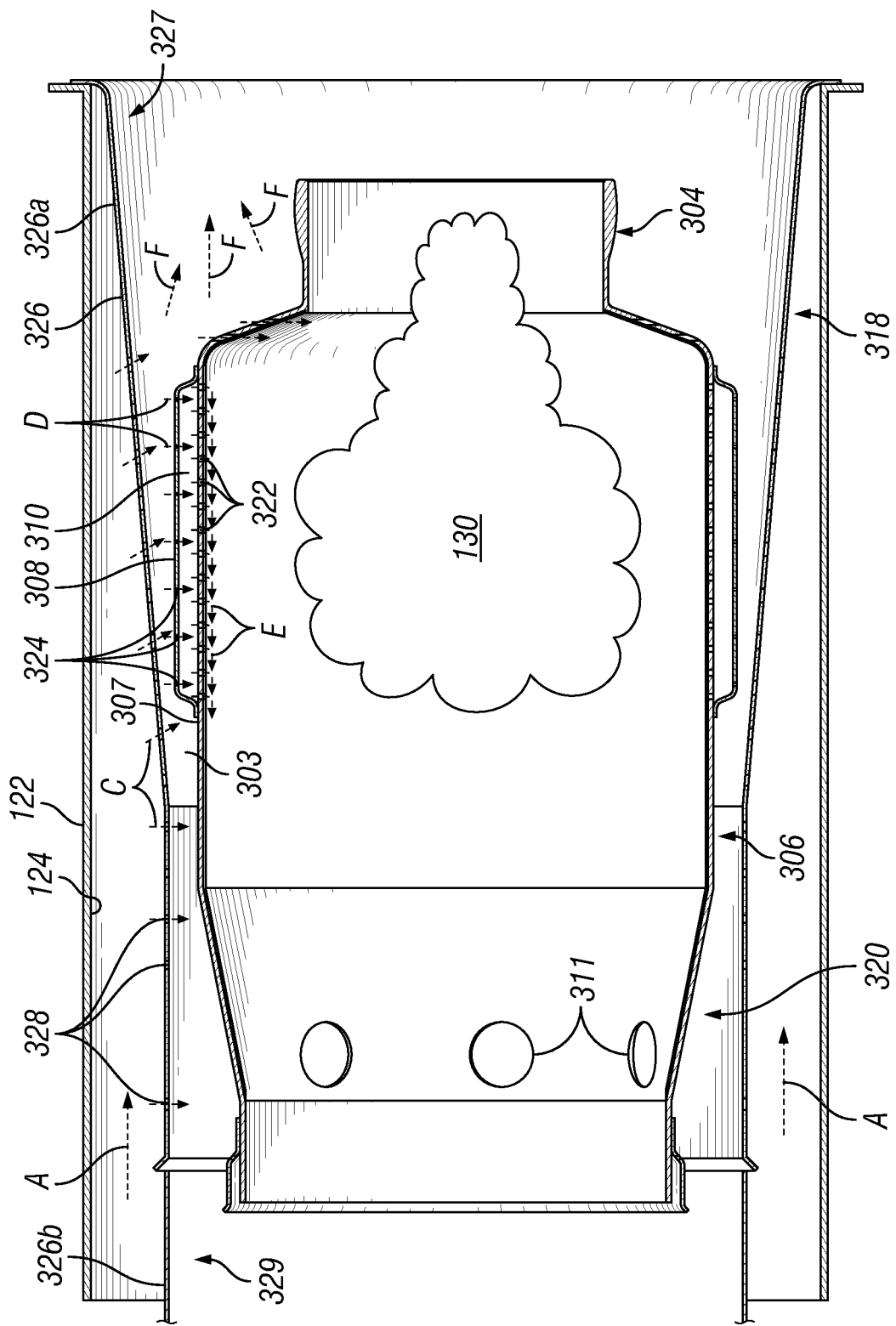
FIG. 4 illustrates a cross-sectional view of the mixer and combustor body in FIGS. 3A and 3B disposed in an acoustic liner in the gas turbine of FIG. 1, according to example embodiments.

FIG. 4 illustrates a cross-sectional view of the mixer 304 and combustor body 306 of the combustor 104 disposed in the first acoustic liner 308 in the gas turbine 100, according to example embodiments. A plurality of effusion cooling holes 322 may be formed in the portion of the outer surface 307 that at least partially defines the acoustic chamber 310. The plurality of effusion cooling holes 322 may be through holes and may be disposed in the form of a matrix on the outer surface 307. The first acoustic liner 308 may define a plurality of impingement cooling holes 324. The plurality of impingement cooling holes 324 may be disposed in the form of a matrix on the first acoustic liner 308. In an example embodiment, the impingement cooling holes 324 may be relatively smaller in size, e.g., diameter, than the effusion cooling holes 322. The effusion cooling holes 322 and the impingement cooling holes 324 may be generally circular in cross section; however, other shapes, such as hexagonal or elliptical, are also envisioned without departing from the scope of the present disclosure.

A generally cylindrical and longitudinally extending second liner 326 may be disposed about the combustor body 306 and the first acoustic liner 308. The second liner 326 may or may not be an acoustic liner. The second liner 326 may include two or more segments (326a, 326b) connected to each other in an end-to-end relationship. As illustrated, a first segment 326a of the second liner 326 may define the plurality of openings or holes 328 disposed along a length thereof. Although not illustrated, a second segment 326b may also define a plurality of holes. A first end 327 of the second liner 326 (also referred to as the upstream end of the first segment 326a) may be coupled to an inner surface 124 of the casing 122 at or adjacent the upstream end 318 of the combustor 104, while a longitudinally opposite second end 329 (also referred to as the downstream end of the second segment 326b) may be disposed at or adjacent the downstream end 320 of the combustor 104. For example, referring to FIGS. 2 and 4, and with respect to the axis of rotation (not shown) of the shaft 101, a radially outer portion 329a of the second liner 326 at the second end 329 may be substantially free from any connection with the casing 122, while a radially inner portion 329b of the second liner 326 at the second end 329 may be coupled at or adjacent the downstream end 320 of the combustor 104. In an example embodiment, the radially outer portion 329a of the second liner 326 may extend generally circumferentially around some or all the plurality of combustors 104 of the gas turbine 100, thereby enclosing (at least partially) the plurality of combustors 104. As used in the present disclosure, the term "substantially free from any connection" may refer to a component completely lacking a connection or having a minimal connection with another component.

Referring to FIG. 4 in conjunction with FIGS. 1, 2, 3A, 3B, and 3C, the compressed air 108 may be received from the compressor 102, as generally indicated by the arrow A. The compressed air 108 may enter an area 303 between the combustor 104 and the second liner 326 via the plurality of holes 328 in the second liner 326, as generally indicated by arrows C. The compressed air 108 flowing across the second liner 326 may be subjected to a relatively low pressure drop (e.g., about 3% to about 4%). The compressed air 108 may impinge on the outer surface 307 of the combustor 104 and the first acoustic liner 308 (thereby cooling the outer surface 307 and the first acoustic liner 308). A portion (e.g., about 30% to about 40%) of the compressed air 108, generally indicated by the arrows F, may enter the swirler 302 and traverse the swirler channels 313, mix with the fuel 116 in the mixer 304 (resulting in the pre-mixed/pre-swirled mixture, discussed above), and enter the combustor body 306 where the mixture of the fuel 116 and compressed air 108 may be ignited to produce the high temperature compressed gas 110. Another portion (e.g., about 30% to about 40%) of the compressed air 108 may enter the combustor body 306 via the dilution holes 311 and may mix with the high temperature compressed gas 110 exiting the combustor body 306. The compressed air 108 entering via the dilution holes 311 may be relatively cooler than the high temperature compressed gas 110 and may lower the temperature of the high temperature compressed gas 110 to a level suitable for supplying to the power turbine 106.

Some of the remaining compressed air 108 in the area 303 may enter the acoustic chamber 310 through the impingement cooling holes 324, as generally indicated by arrows D, while the rest may enter through holes (not shown) defined in the second end 329 of the second line 326. The compressed air 108 entering the acoustic chamber 310 may be accelerated due to the relatively smaller size of the impingement cooling holes 324. The compressed air 108 may also experience a relatively greater pressure drop as the compressed air 108 flows across the first acoustic liner 308. As a result, the acoustic chamber 310 may include air having a substantially reduced pressure (about 1% to about 2%) relative to the compressed air 108 from the compressor 102.

Due to the relatively larger size of the effusion cooling holes 322, the low pressure air in the acoustic chamber 310 may enter the combustor body 306 (at or adjacent the combustion zone 130) with a substantially reduced velocity compared to the velocity of the compressed air 108 when entering the acoustic chamber 310. As shown in FIG. 4, the low pressure air entering the combustor body 306, generally indicated by the arrows E, may flow along the inner surface of the combustor body 306. The low pressure air entering the combustion zone 130 may be minimized and this may avoid localized cooling (also referred to as quenching) and prevent formation of gases, such as, carbon monoxide (CO).

In operation, a flame (not shown) may be initially established in the mixer 304 and/or the combustion zone 130 by the introduction of a small quantity of fuel 116 (also referred to as pilot fuel), via the pilot fuel holes 316 in the swirler 302. As an increase in the load on the power turbine 106 may require an increased output from the combustor 104, additional fuel 116 may be added via the fuel pegs 314. Since the fuel pegs 314 may result in a better distribution of the fuel 116 within the compressed air 108, a leaner fuel/air mixture may be produced, which may reduce NOx generation. Once ignition is established in the combustion zone 130 and the gas turbine 100 has reached a predetermined power output level, e.g., greater than about 80% of full power, the fuel 116 to the pilot fuel holes 316 may be shut-off and the gas turbine 100 may operate under premix (leaner fuel/air mixture) combustion.

Figure 5:
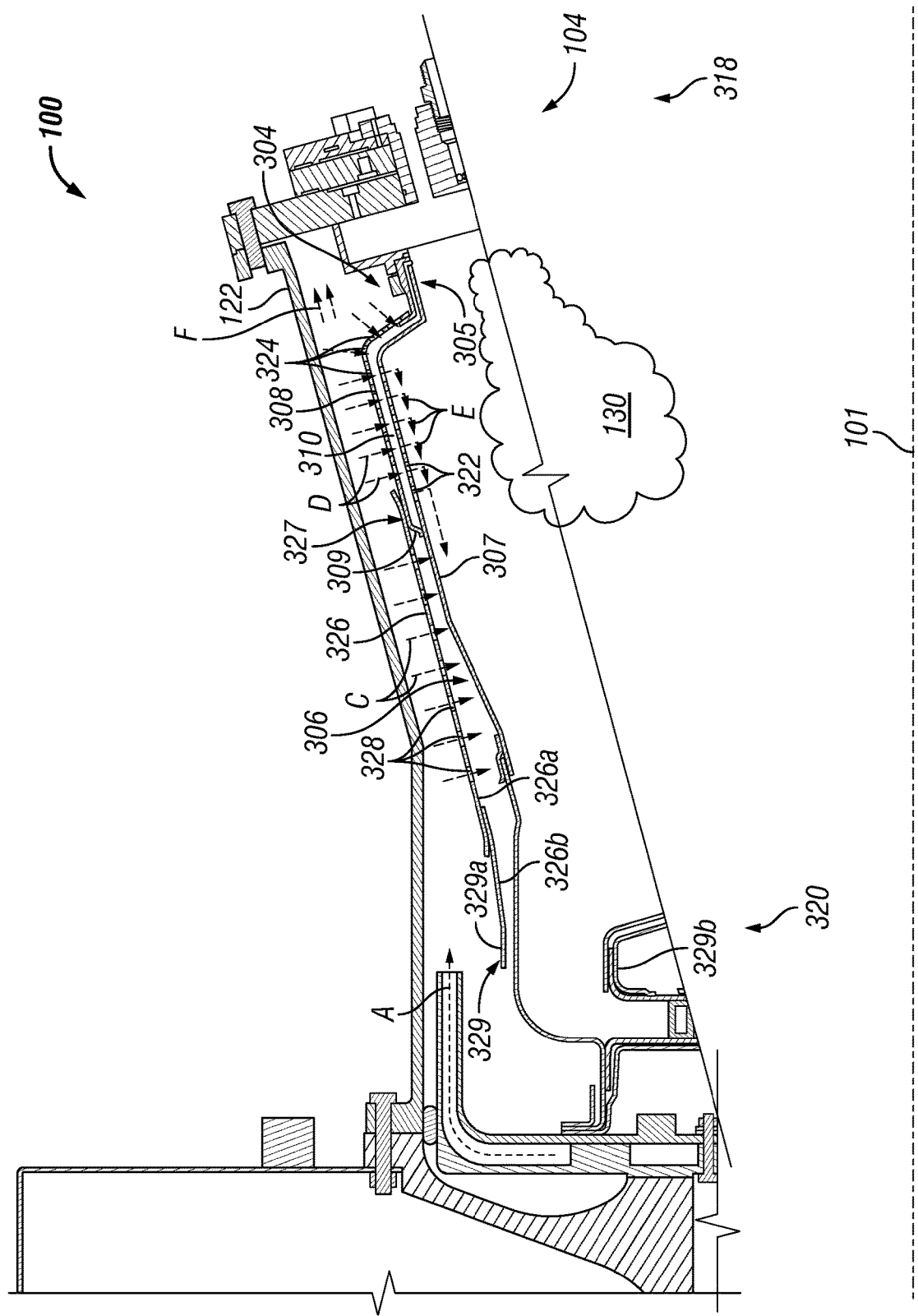
FIG. 5 is a partial cross-sectional view illustrating in relatively greater detail the gas turbine in FIG. 1, the gas turbine including the combustor of FIGS. 1, 2, 3A, and 3B disposed in a first acoustic liner and a second liner, according to example embodiments.

FIG. 5 is a partial cross-sectional view illustrating in relatively greater detail the gas turbine 100, the gas turbine 100 including the combustor 104 disposed in a first acoustic liner 308 and a second liner 326, according to example embodiments. The gas turbine 100, and the combustor 104 disposed in a first acoustic liner 308 and a second liner 326 as illustrated in FIG. 5 may be similar in some respects to the gas turbine, and the combustor disposed in the first acoustic liner and the second liner in FIGS. 2 and 4 described above and therefore may be best understood with reference to the description of FIGS. 2 and 4 where like numerals designate like components and will not be described again in detail. As illustrated in FIG. 5, the first acoustic liner 308 may be disposed encircling a portion of the outer surface 307 of the combustor body 306 and the first acoustic liner 308 may be generally disposed at or adjacent the location of the combustion zone 130 in the combustor body 306. The first acoustic liner 308 may be radially spaced from the outer surface 307 and an upstream end (not shown) of the first acoustic liner 308 may be coupled to the mixer 304, generally at 305. A downstream end (not shown) of the first acoustic liner 308 may be coupled to the outer surface 307 of the combustor body 306 via a sidewall 309. The first acoustic liner 308 may generally follow the outer surface 307 (e.g., disposed generally parallel to the outer surface 307) of the combustor body 306. Although not illustrated, the first acoustic liner 308 may also be radially spaced from an outer surface (or at least a portion thereof) of the mixer 304 and may be coupled to the outer surface of the mixer 304 at or adjacent an upstream end thereof.

As illustrated, an acoustic chamber 310 may be defined by the first acoustic liner 308 and the outer surface 307 connected to each other. The first acoustic liner 308 may define the plurality of impingement cooling holes 324. The portion of the combustor 104 adjacent the first acoustic liner 308 may define the plurality of effusion cooling holes 322 adjacent the combustion zone 130. The size (e.g., diameter) of the effusion cooling holes 322 may be greater than the size (e.g., diameter) of the impingement cooling holes 324.

The second liner 326 may be generally cylindrical in shape and may extend longitudinally along the combustor body 306. The second liner 326 may comprise two or more segments (326a, 326b) connected to each other in an end-to-end relationship. As illustrated, the first segment 326a of the second liner 326 may define the plurality of openings or holes 328 disposed along a length thereof. Although not illustrated, the second segment 326b may also define a plurality of holes. The first end 327 of the second liner 326 (also referred to as the upstream end of the first segment 326a) may be coupled to the first acoustic liner 308, while the longitudinally opposite second end 329 (also referred to as the downstream end of the second segment 326b) may be disposed at or adjacent the downstream end 320 of the combustor 104. As illustrated, with reference to the axis of rotation (not shown) of the shaft 101, a radially outer portion 329a of the second liner 326 at the second end 329 may not be coupled to the combustor 104, while a radially inner portion 329b of the second liner 326 at the second end 329 may be coupled at or adjacent the downstream end 320 of the combustor 104. In an example embodiment, the radially outer portion 329a of the second liner 326 may extend generally circumferentially around some or all of the plurality of combustors 104 of the gas turbine 100, thereby enclosing (at least partially) the plurality of combustors 104. As such, only the first end 327 of the second liner 326 may be coupled to the first acoustic liner 308.

The compressed air 108 (FIG. 1) from the compressor 102 (FIG. 1) may be received in an area between the casing 122 and the combustor 104, as generally indicated by the arrow A. A first portion (e.g., about 30% to about 40%) of the compressed air 108 may flow across the second liner 326 via the plurality of holes 328, as generally indicated by arrows C. The first portion of the compressed air 108 may enter the combustor body 306 via the dilution holes 311 (not shown) and may mix with the high temperature compressed gas 110 (generated by the combustion of the fuel 116 and the compressed air 108) exiting the combustor body 306. The first portion of the compressed air 108 entering via the dilution holes 311 may be relatively cooler than the high temperature compressed gas 110 and may lower the temperature of the high temperature compressed gas 110 to a level suitable for supplying to the power turbine 106 (FIG. 1). A second portion (e.g., about 30% to about 40%) of the compressed air 108, indicated by the arrows F, may enter the swirler 302 (FIGS. 3A-3C) and traverse the swirler channels 313 in the swirler 302, mix with the fuel 116 in the mixer 304 (FIGS. 3A-3C), and enter the combustor body 306 where the mixture of the fuel 116 and compressed air 108 may be ignited to produce the high temperature compressed gas 110.

Some of the remaining compressed air 108 may enter the acoustic chamber 310 through the impingement cooling holes 324 on the first acoustic liner 308, as generally indicated by arrows D, while the rest of the compressed air 108 may enter through holes (not shown) defined in the second end 329 of the second liner 326. The compressed air 108 entering the acoustic chamber 310 may be accelerated due to the relatively smaller size of the impingement cooling holes 324 and may experience a relatively greater pressure drop (e.g., greater differential pressure across the first acoustic liner 308) as the compressed air 108 flows across the first acoustic liner 308. As a result, the acoustic chamber 310 may include air having a substantially reduced pressure relative to the compressed air 108 received from the compressor 102.

The low pressure air in the acoustic chamber 310 may enter the combustor body 306 at or adjacent the combustion zone 130 via the plurality of effusion cooling holes 322. The low pressure air entering the combustor body 306 may be generally indicated by the arrows E. The low pressure air may be prevented from entering the combustion zone 130, thereby avoiding localized cooling (also referred to as quenching) and preventing formation of gases, such as, carbon monoxide (CO). As indicated by the arrows E in FIG. 5, the low pressure air may flow along the inner surface of the combustor 104 and may form a film on the inner surface.

The operation of the gas turbine 100 including the combustor 104 illustrated in FIG. 5 may be similar to the operation of the gas turbine 100 including the combustor 104 described with respect to FIGS. 2, 3A-3C and 4, and will, therefore, be omitted for the sake of brevity.

According to example embodiments illustrated in FIGS. 2, 3A-3C, 4, and 5, the first acoustic liner 308 with the impingement cooling holes 324 and the combustor body 306 with the effusion cooling holes 322 may function as a Helmholtz oscillator that may dampen the acoustic energy, e.g., due to the damaging pressure waves, in the combustor 104. Examples of acoustic liners functioning as a Helmholtz oscillator may be found in co-owned U.S. Pat. No. 6,601,672 entitled "Double Layer Acoustic Liner and a Fluid Pressurizing Device and Method Utilizing Same" and co-owned U.S. Pat. No. 8,596,413 entitled "Acoustic Array of Polymer Material," each of these co-owned patents are incorporated herein by reference to the extent not inconsistent with the present disclosure. According to example embodiments, the temperature, pressure, and/or relative geometries of the impingement cooling holes 324, the effusion cooling holes 322, and/or the acoustic chambers 310 may determine the acoustic frequencies generated in the combustor 104 that may be damped.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A gas turbine, comprising:
a rotatable shaft;
a compressor disposed about the rotatable shaft and configured to output compressed air;
a can-annular combustion system comprising a plurality of combustors disposed about the rotatable shaft and at least partially enclosed in a casing of the gas turbine, a combustor of the plurality of combustors configured to receive the compressed air and output high temperature compressed gas having a temperature greater than a temperature of the compressed air;
a power turbine disposed about the rotatable shaft and configured to receive the high temperature compressed gas from the combustor, the power turbine configured to expand the high temperature compressed gas and rotate the rotatable shaft; and
an acoustic liner coupled to an outer surface of the combustor and defining an acoustic chamber between the acoustic liner and the outer surface of the combustor, the acoustic liner defining a plurality of impingement cooling holes and being configured to attenuate acoustic energy generated in the combustor, wherein a portion of the outer surface of the combustor that defines the acoustic chamber further defining a plurality of effusion cooling holes,
wherein a diameter of each effusion cooling hole of the plurality of effusion cooling holes is greater than a diameter of each impingement cooling hole of the plurality of impingement cooling holes;
a second liner extending along a longitudinal axis of the combustor and around the combustor, the second liner defining a plurality of holes and having a first end and a longitudinally opposite second end, the first end being coupled to an inner surface of the casing of the gas turbine at or adjacent an upstream end of the combustor and the longitudinally opposite second end being free from a connection with the casing of the gas turbine,
wherein the compressed air from the compressor entering the acoustic chamber through the plurality of impingement cooling holes, due to the relatively smaller diameter of the plurality of impingement cooling holes, experiences a pressure drop as the compressed air flows across the plurality of impingement cooling holes in the acoustic liner, thereby the acoustic chamber being with air having a reduced pressure compared to a pressure of the compressed air from the compressor prior to flowing through the plurality of impingement cooling holes,
wherein the reduction of pressure of air in the acoustic chamber is in a range from 1% to 2% relative to the pressure of the compressed air from the compressor prior to flowing through the plurality of impingement cooling holes,
wherein air exits the acoustic chamber through the plurality of effusion cooling holes to form a cooling film of air along an inner surface of the combustor,
wherein, based on the reduced pressure of air in the acoustic chamber, an amount of the exiting air that enters into a combustion zone of the combustor is reduced, and this reduction is effective to avoid localized cooling and formation of undesirable gases in the combustion zone.

2. The gas turbine of claim 1, wherein a differential pressure across the acoustic liner is substantially greater than a differential pressure across a portion of the combustor adjacent the acoustic liner.

3. The gas turbine of claim 1, wherein a differential pressure across the acoustic liner is substantially greater than a differential pressure across the second liner.

4. The gas turbine of claim 1, wherein the second liner is disposed such that the compressed air is received between the casing of the gas turbine and the second liner, the compressed air flowing through the plurality of holes in the second liner.

5. The gas turbine of claim 4, wherein
the acoustic liner is disposed such that at least a portion of the compressed air flowing across the second liner is input to the acoustic chamber via the plurality of impingement cooling holes.

6. The gas turbine of claim 4, wherein the combustor defines a plurality of dilution holes circumferentially disposed at or adjacent a downstream end thereof and at least a portion of the compressed air flowing across the second liner is input to the combustor via the plurality of dilution holes.

7. The gas turbine of claim 4, wherein at least a portion of the compressed air flowing across the second liner is input to the combustor at the upstream end of the combustor.

8. The gas turbine of claim 7, wherein the combustor comprises a swirler disposed at the upstream end thereof, the swirler configured to receive the compressed air, the swirler including a plurality of swirler vanes configured to swirl the compressed air.

9. The gas turbine of claim 8, wherein:
   the combustor further comprises a mixer and a combustor body, the swirler being in fluid communication with the combustor body via the mixer, the mixer being disposed between the swirler and the combustor body,
   the mixer is configured to mix fuel with the swirled compressed air received from the swirler prior to outputting a mixture of the fuel and the swirled compressed air to the combustor body, and
   the mixture of the fuel and the swirled compressed air is ignited in a combustion zone defined in the combustor body.

10. The gas turbine of claim 9, wherein the plurality of effusion cooling holes is disposed adjacent the combustion zone.

\* \* \* \* \*